(12) United States Patent
Lewis (10) Patent No.: US 11,505,952 B1
(45) Date of Patent: Nov. 22, 2022

(54) LEVEL MARKING DEVICE FOR DRYWALL INSTALLATION

(71) Applicant: Jacob Scott Lewis, West Salem, OH (US)

(72) Inventor: Jacob Scott Lewis, West Salem, OH (US)

( * ) Notice: Subject to any disclaimer, the term of this patent is extended or adjusted under 35 U.S.C. 154(b) by 338 days.

(21) Appl. No.: 16/810,748

(22) Filed: Mar. 5, 2020

Related U.S. Application Data (60) Provisional application No. 62/814,795, filed on Mar. 6, 2019.

(51) Int. Cl.
*G01C 9/02* (2006.01)
*E04F 21/18* (2006.01)

(52) U.S. Cl.
CPC .............. *E04F 21/18* (2013.01); *G01C 9/02* (2013.01)

(58) Field of Classification Search
CPC .................................. E04F 21/18; G01C 9/02
USPC ........................................................ 33/332
See application file for complete search history.

(56) References Cited

U.S. PATENT DOCUMENTS

| | | | |
|---|---|---|---|
| 2,386,833 A | 10/1945 | Baldwin | |
| 3,521,364 A | 7/1970 | Metcalfe | |
| 4,501,057 A | 2/1985 | Palomera | |
| 4,574,492 A | 3/1986 | Miller | |
| 4,910,876 A | 3/1990 | Channell | |
| 6,421,928 B1 * | 7/2002 | Miller | A47G 1/205 33/669 |
| 6,463,666 B1 | 10/2002 | Szumer | |
| 6,785,977 B1 * | 9/2004 | Crichton | G01C 9/00 33/613 |
| 6,836,969 B1 | 1/2005 | Bates | |
| 6,842,993 B1 * | 1/2005 | DiMauro | B25H 7/02 33/528 |
| 6,944,962 B2 | 9/2005 | Tessel et al. | |
| 7,437,830 B1 | 10/2008 | Kulavic | |
| 8,276,332 B2 * | 10/2012 | Henriquez | E04B 1/161 52/506.05 |
| 8,539,691 B2 * | 9/2013 | Daniel | F16M 11/105 33/645 |
| 8,857,116 B2 * | 10/2014 | Henriquez | E04B 1/161 52/506.05 |
| 2001/0029715 A1 * | 10/2001 | Bradley | E04F 21/18 52/459 |
| 2004/0049936 A1 | 3/2004 | Newman | |
| 2006/0174500 A1 | 8/2006 | Knirck | |

(Continued)

*Primary Examiner* — Yaritza Guadalupe-McCall
(74) *Attorney, Agent, or Firm* — The Law Office of Patrick F. O'Reilly III, LLC (57) ABSTRACT

A level marking device for drywall installation is disclosed herein. In one embodiment, the level marking device includes a body portion configured to be attached to a carpenter's level; and a pin member coupled to the body portion. In another embodiment, the level marking device includes a carpenter's level, the carpenter's level including a body portion and a level indicator for establishing a horizontal and/or vertical line or plane; and a pin member coupled to the carpenter's level. The pin member of the level marking device is configured to be positioned at the intersection of one side of a stud and an edge of drywall. The level marking device is configured to position one edge of the carpenter's level approximately aligned with a centerline of the stud so as to enable a guide line to be marked on the drywall that approximates the centerline of the stud.

14 Claims, 9 Drawing Sheets

(56) References Cited

U.S. PATENT DOCUMENTS

| | | | | |
|---|---|---|---|---|
| 2006/0265895 | A1 | 11/2006 | Daugherty | |
| 2007/0011971 | A1* | 1/2007 | Sitkiewicz | E04B 2/767 52/481.1 |
| 2010/0058686 | A1* | 3/2010 | Henriquez | E04B 1/161 52/506.05 |
| 2011/0083398 | A1* | 4/2011 | Manion, Jr. | B25H 7/02 52/749.1 |
| 2012/0246957 | A1* | 10/2012 | Daniel | G01C 9/24 33/645 |
| 2013/0019549 | A1* | 1/2013 | Henriquez | E04C 2/384 52/220.2 |

\* cited by examiner

Section A-A

LEVEL MARKING DEVICE FOR DRYWALL INSTALLATION

CROSS-REFERENCE TO RELATED APPLICATIONS

This patent application claims priority to, and incorporates by reference in its entirety, U.S. Provisional Patent Application No. 62/814,795, entitled "Level Marking Device for Drywall Installation", filed on Mar. 6, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a level marking device for drywall installation. More particularly, the invention relates to a level marking device for enabling a guide line to be marked on the drywall approximating the centerline of a stud where the stud is partially concealed from view by the drywall.

2. Background

A problem encountered with hanging drywall on studs of a wall is that there are no marks on the surface of the drywall for indicating the proper locations of screws or nails. That is, once the drywall is placed against the studs for hanging, the studs behind the sheet of drywall are no longer visible to the installer. As such, during the typical drywall installation, the installer has to either guess the location of the studs or hold a level over the center of the stud, and move the level around until the level is plumb and in the center of the stud. Also, when an installer hangs drywall on a ceiling, the installer has to hold one end of a level in the center of the joist or the truss and line the other end of the level up with either a mark on the wall that indicates the center of the joist or truss, or line the other end of the level up with the screws of the last drywall sheet that was hung. During the above-described process, it is difficult for the installer to hold the level steady with one hand while marking a line with the other. This process also is overly time-consuming and strenuous on the installer's shoulders.

Therefore, what is needed is a level marking device for drywall installation that makes it significantly easier to mark the center of the studs. Moreover, a level marking device for drywall installation is needed that enables the quicker marking of the center of the studs. Furthermore, a level marking device for drywall installation is needed that results in the more accurate marking of the center of studs.

BRIEF SUMMARY OF EMBODIMENTS OF THE INVENTION

Accordingly, the present invention is directed to a level marking device that substantially obviates one or more problems resulting from the limitations and deficiencies of the related art.

In accordance with one or more embodiments of the present invention, there is provided a level marking device for drywall installation that includes a body portion configured to be attached to a carpenter's level; and a pin member coupled to the body portion, the pin member configured to be positioned at the intersection of one side of a stud and an edge of drywall. The level marking device is configured to position one edge of the carpenter's level approximately aligned with a centerline of the stud so as to enable a guide line to be marked on the drywall that approximates the centerline of the stud.

In a further embodiment of the present invention, the body portion of the level marking device is approximately C-shaped such that the body portion of the level marking device is configured to overlap two oppositely disposed sides of the carpenter's level.

In yet a further embodiment, the level marking device further comprises a width adjustment member slidably coupled to the body portion of the level marking device, the width adjustment member configured to enable the level marking device to be attached to carpenter's levels having different widths.

In still a further embodiment, the level marking device further comprises one or more tightening knobs disposed on the body portion of the level marking device, the one or more tightening knobs configured to tighten the width adjustment member against one side of the carpenter's level so that the body portion of the level marking device is capable of being securely attached to the carpenter's level.

In yet a further embodiment, the body portion of the level marking device further comprises a plurality of pin placement holes disposed therethrough, each of the pin placement holes configured to removably accommodate the pin member so that a user is able to selectively position the pin member on the body portion of the level marking device, and each of the pin placement holes corresponding to a respective one of a plurality of predetermined stud widths.

In still a further embodiment, a first end portion of the pin member comprises external threads and at least one of the pin placement holes comprises internal threads that correspond to the external threads on the pin member such that the first end portion of the pin member is capable of threadingly engaging the at least one of the pin placement holes.

In yet a further embodiment, a second end portion of the pin member comprises a slot formed therein for accommodating a screwdriver for tightening the pin member on the body portion of the level marking device.

In still a further embodiment, the plurality of predetermined stud widths are selected from the group consisting of: (i) a one and one-quarter inch wide stud, (ii) a one and one-half inch wide stud, (iii) a two inch wide stud, (iv) a two and one-half inch wide stud, and (v) combinations thereof.

In accordance with one or more other embodiments of the present invention, there is provided a level marking device for drywall installation that includes a carpenter's level, the carpenter's level including a body portion and a level indicator for establishing a horizontal and/or vertical line or plane; and a pin member coupled to the carpenter's level, the pin member protruding outwardly from a surface of the carpenter's level, the pin member configured to be positioned at the intersection of one side of a stud and an edge of drywall. The level marking device is configured to position one edge of the carpenter's level approximately aligned with a centerline of the stud so as to enable a guide line to be marked on the drywall that approximates the centerline of the stud.

In a further embodiment of the present invention, the body portion of the carpenter's level further comprises a plurality of pin placement holes disposed therethrough, each of the pin placement holes configured to removably accommodate the pin member so that a user is able to selectively position the pin member on the body portion of the carpenter's level, and each of the pin placement holes corresponding to a respective one of a plurality of predetermined stud widths.

In yet a further embodiment, a first end portion of the pin member comprises external threads and at least one of the pin placement holes comprises internal threads that correspond to the external threads on the pin member such that the first end portion of the pin member is capable of threadingly engaging the at least one of the pin placement holes.

In still a further embodiment, a second end portion of the pin member comprises a slot formed therein for accommodating a screwdriver for tightening the pin member on the body portion of the level marking device.

In yet a further embodiment, the plurality of predetermined stud widths are selected from the group consisting of: (i) a one and one-quarter inch wide stud, (ii) a one and one-half inch wide stud, (iii) a two inch wide stud, (iv) a two and one-half inch wide stud, and (v) combinations thereof.

In still a further embodiment, the body portion of the carpenter's level further comprises an elongate slot disposed therethrough, the pin member configured to be slidably displaced along a length of the elongate slot so that a user is able to selectively position the pin member on the body portion of the carpenter's level to accommodate a particular stud width.

In yet a further embodiment, the body portion of the carpenter's level further comprises indicia disposed adjacent to the elongate slot, the indicia denoting a plurality of different stud widths so as to facilitate the correct positioning of the pin member along the length of the elongate slot by the user for a desired stud width.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 9:
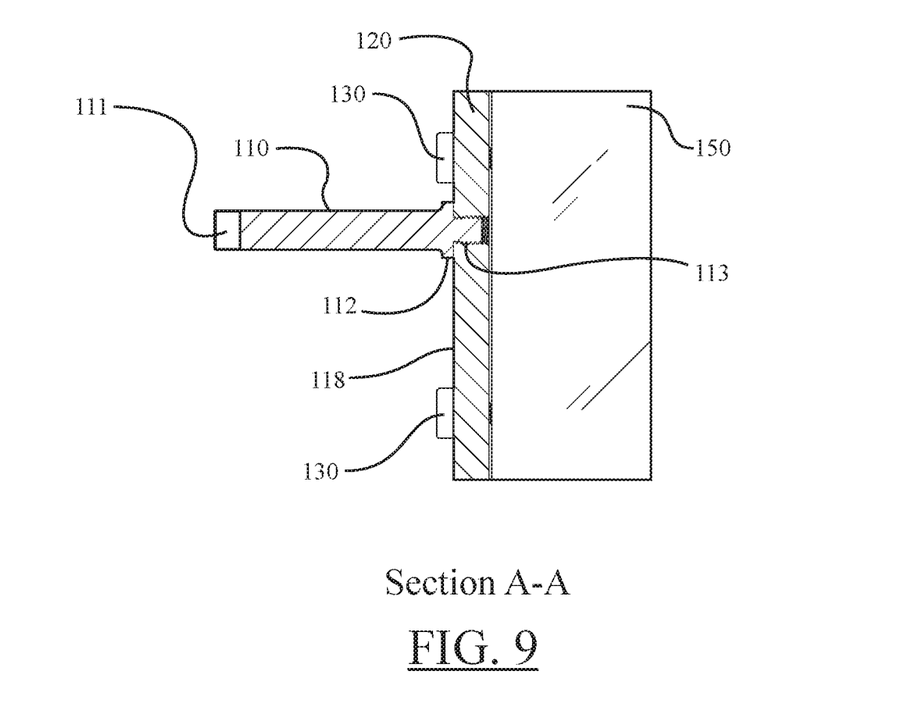
FIG. 9 is a transverse sectional view cut through the level marking device of FIG. 1, wherein the section is generally cut along the cutting-plane line A-A in FIG. 8.
Figure 10:
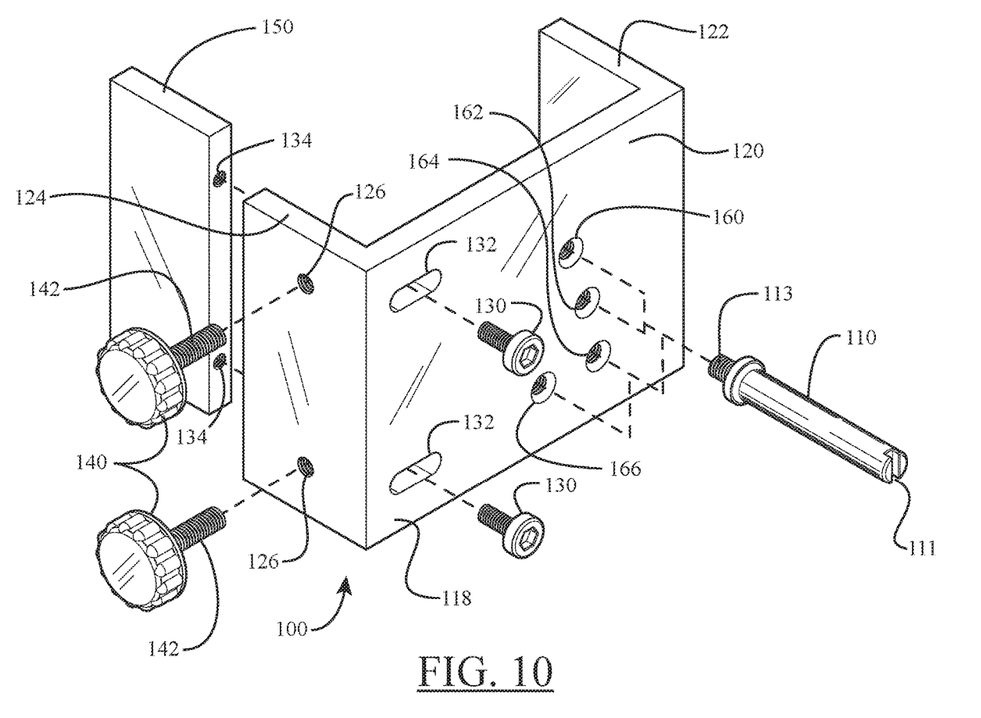
FIG. 10 is an exploded perspective view of the level marking device of FIG. 1.
Figure 11:
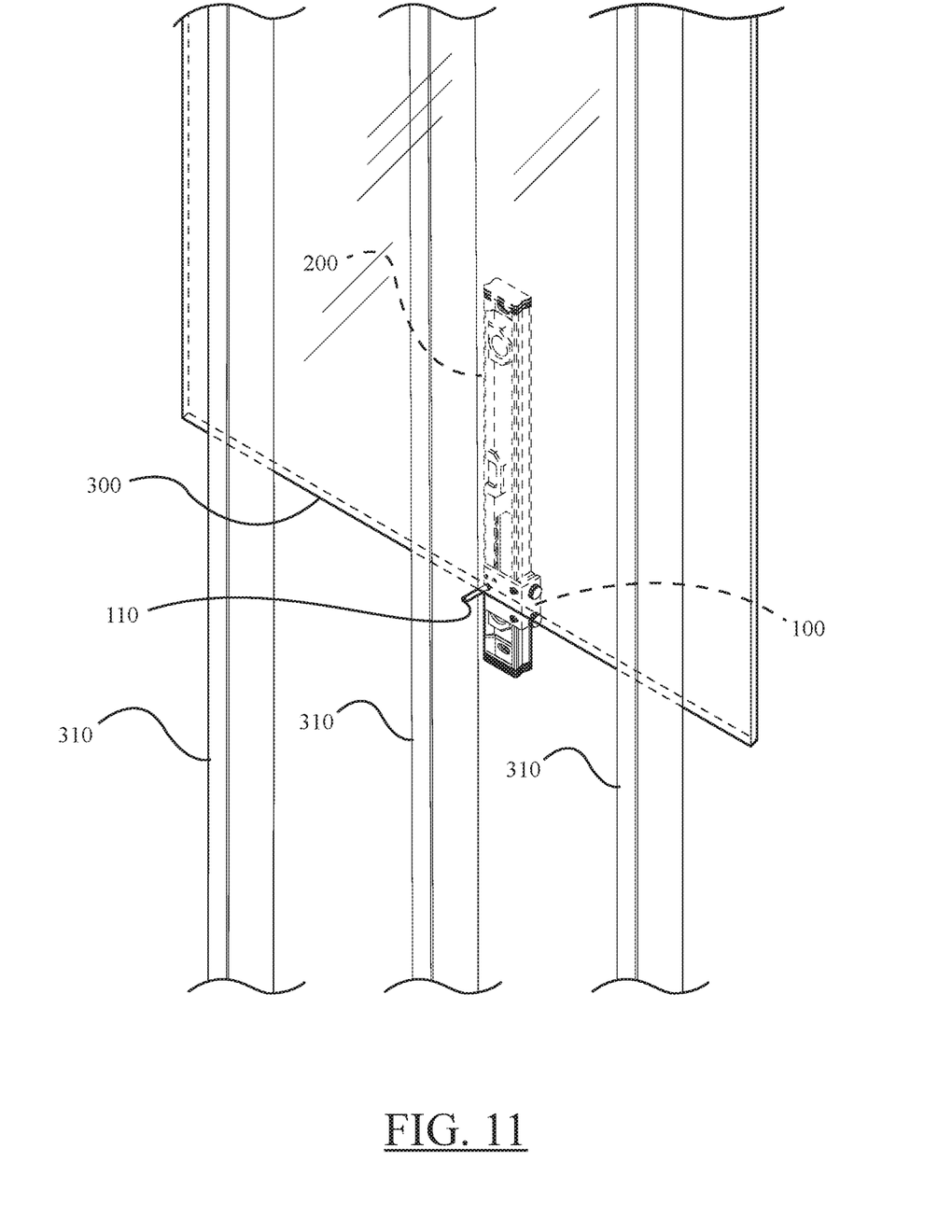
FIG. 11 is a perspective view illustrating the manner in which the level marking device of FIG. 1 is used to mark a stud centerline on drywall.

An illustrative embodiment of a level marking device for drywall installation is seen generally at 100 in FIGS. 1-12. With initial reference to FIGS. 1 and 2, the level marking device 100 for drywall installation generally comprises a body portion 118 configured to be attached to a carpenter's level 200; and a pin member 110 coupled to the body portion 118, the pin member 110 configured to be positioned at the intersection of one side of a stud 310 and an edge of drywall 300 (e.g., as illustrated in FIG. 11). The level marking device 100 is configured to position one edge of the carpenter's level 200 approximately aligned with a centerline of the stud 310 so as to enable a guide line to be marked on the drywall 300 that approximates the centerline of the stud 310.

Figure 1:
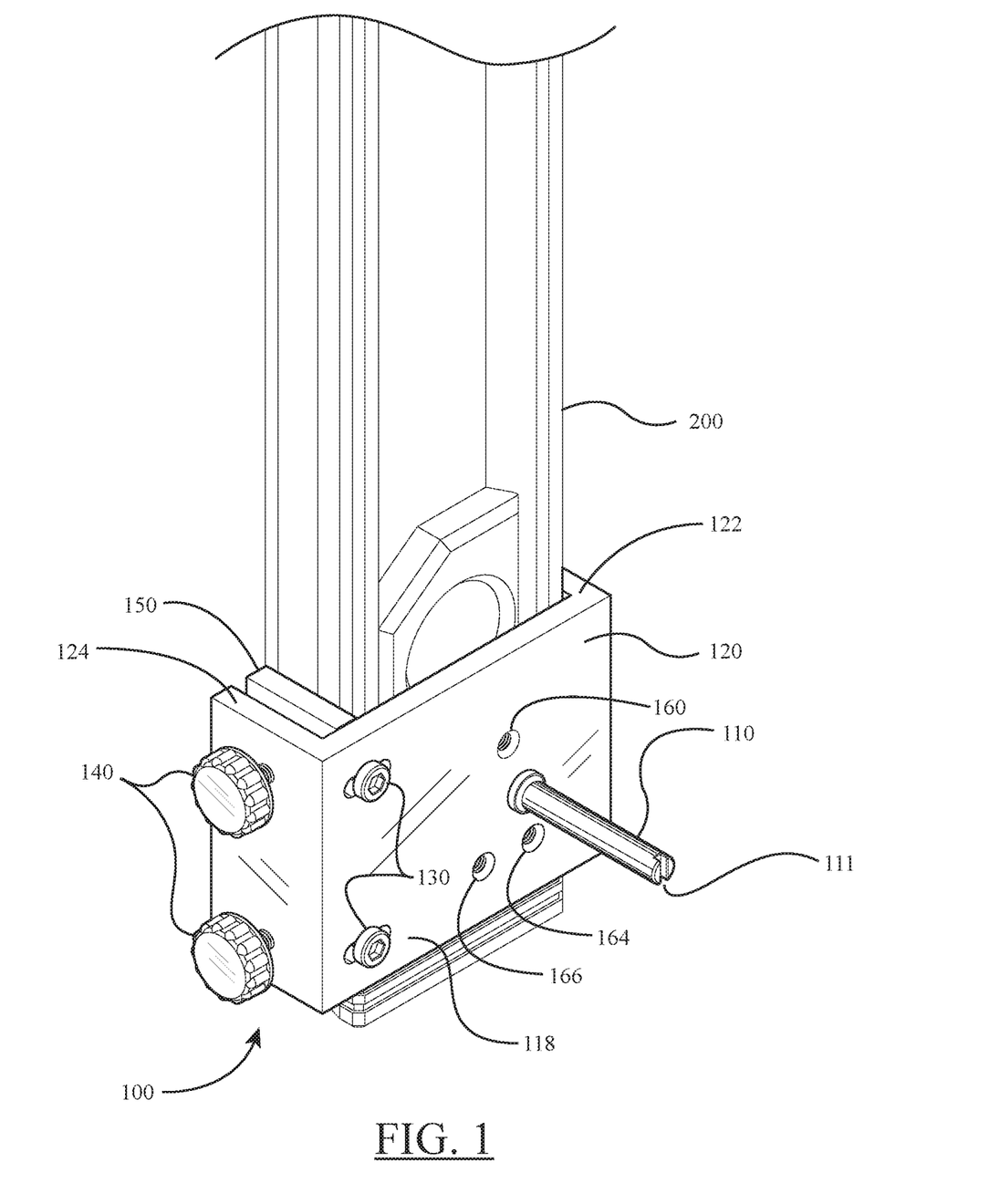
FIG. 1 is a top-front perspective view of a level marking device for drywall installation, according to an illustrative embodiment of the invention.
Figure 2:
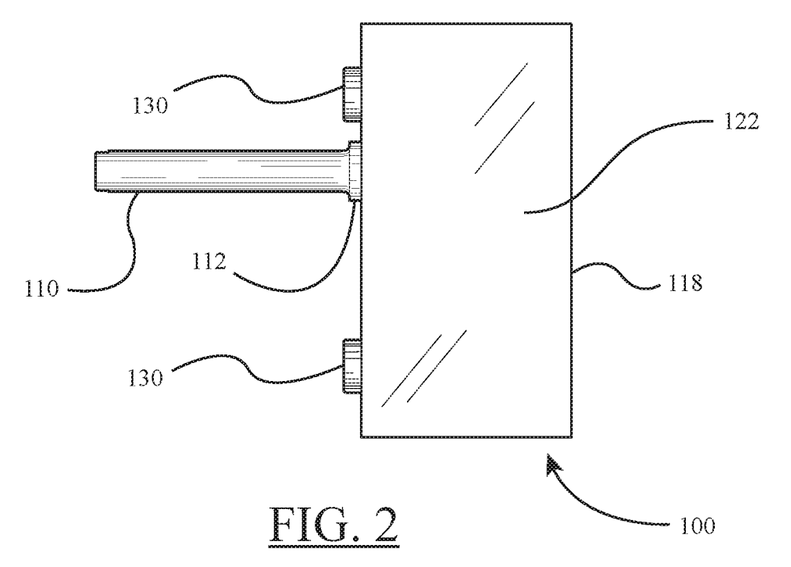
FIG. 2 is a first side elevational view of the level marking device of FIG. 1.

As best shown in FIGS. 1 and 6-8, in the illustrative embodiment, the body portion 118 of the level marking device 100 is approximately C-shaped such that the body portion 118 of the level marking device 100 is configured to overlap two oppositely disposed sides of the carpenter's level 200 (see FIG. 1). More specifically, in the illustrative embodiment, the approximately C-shaped body portion 118 of the level marking device 100 is formed by a transverse wall 120, a first sidewall 122 disposed at a first end of the transverse wall 120, and a second sidewall 124 disposed at a second end of the transverse wall 120. In the illustrative embodiment, the first sidewall 122 and the second sidewall 124 are each disposed generally perpendicular to the transverse wall 120 of the body portion 118.

Also, as shown in the illustrative embodiment of FIGS. 1 and 6-8, the level marking device 100 further comprises a width adjustment member 150 slidably coupled to the body portion 118 of the level marking device 100. The width adjustment member 150 is configured to enable the level marking device 100 to be attached to carpenter's levels having different widths. In the illustrative embodiment, the width adjustment member 150 is in the form of a slidably adjustable plate that is connected to the transverse wall 120 of the body portion 118 by a pair of fastener members 130 (e.g., screws 130). Referring to the front view of FIG. 4, it can be seen that each of the fastener members 130 (e.g., screws 130) is received within a respective elongate slot 132 having rounded ends. The elongate slots 132 allow the fastener members 130 received therein to be displaced along the lengths of the slots 132 so as to permit the position of the width adjustment member 150 to be adjusted to carpenter's levels of different widths. As shown in the exploded view of FIG. 10, the width adjustment member 150 is provided with internally threaded bores or holes 134 formed therein so as to allow the fastener members 130 to threadingly engage the width adjustment member 150. In the perspective view of FIG. 8, the width adjustment member 150 is shown in a position adjacent to the second sidewall 124 of the body portion 118, which is the position of the width adjustment member 150 that allows the level marking device 100 to accommodate the widest level 200.

Figure 8:
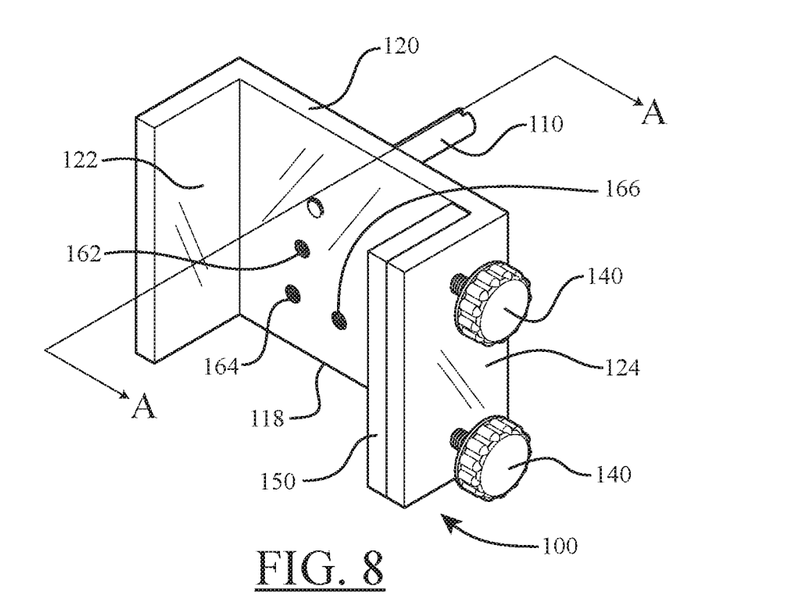
FIG. 8 is a rear-top perspective view of the level marking device of FIG. 1.

In addition, with combined reference to FIGS. 1, 8, and 10 of the illustrative embodiment, it can be seen that the level marking device 100 further comprises a pair of tightening knobs 140 disposed on the body portion 118 of the level marking device 100. The pair of tightening knobs 140 are configured to tighten the width adjustment member 150 against one side of the carpenter's level 200 (e.g., as shown in FIG. 1) so that the body portion 118 of the level marking device 100 is capable of being securely attached to the carpenter's level 200. In the illustrative embodiment, the second sidewall 124 of the body portion 118 of the level marking device 100 is provided with a pair of internally threaded apertures 126. Each of the internally threaded apertures 126 threadingly engages with a respective externally threaded shaft 142 that extends from a respective tightening knob 140. When each of the tightening knobs 140 are rotated in a first direction (e.g., a clockwise direction), the ends of the shafts 142 press against the side of the width adjustment member 150 so as to tighten the width adjustment member 150 against the side of the level 200, thereby securing the level marking device 100 to the level 200. When each of the tightening knobs 140 are rotated in a second, opposite direction (e.g., a counter-clockwise direction), the ends of the shafts 142 are displaced away from the side of the width adjustment member 150 so that the level marking device 100 can be removed from the level 200.

Figure 3:
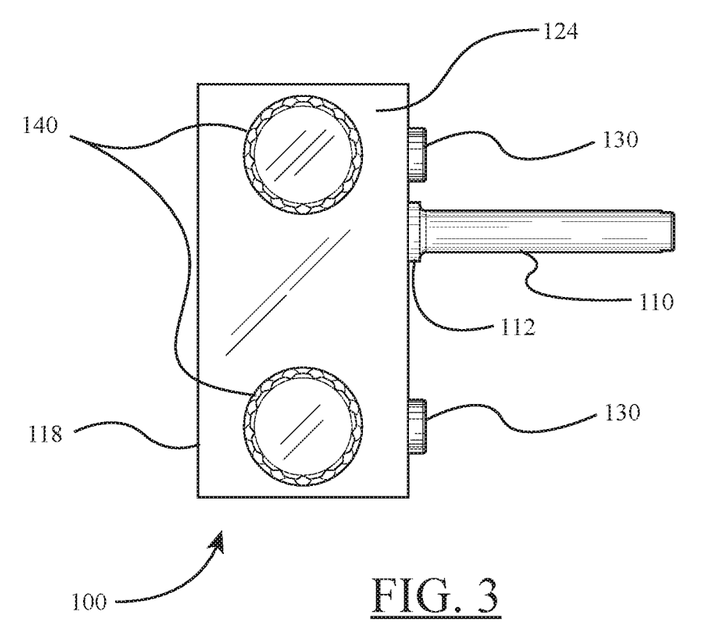
FIG. 3 is a second side elevational view of the level marking device of FIG. 1.
Figure 4:
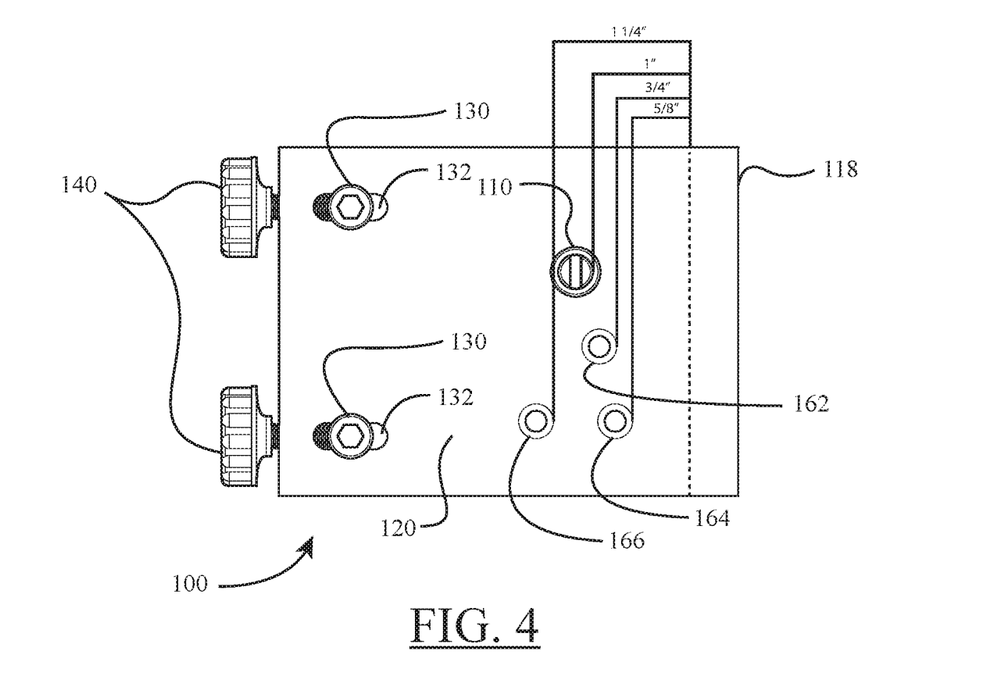
FIG. 4 is a front elevational view of the level marking device of FIG. 1.
Figure 5:
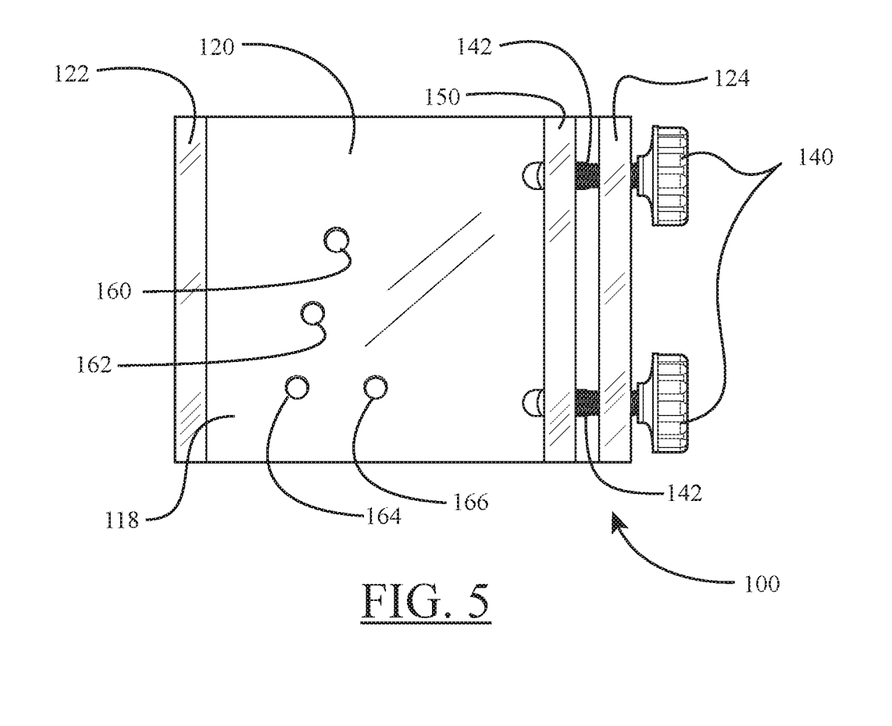
FIG. 5 is a rear elevational view of the level marking device of FIG. 1.
Figure 6:
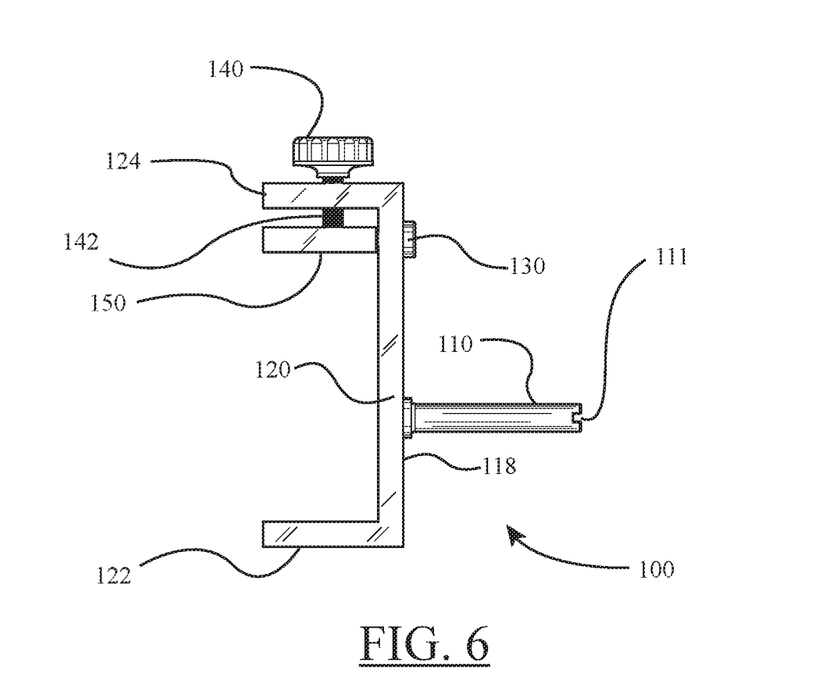
FIG. 6 is a bottom plan view of the level marking device of FIG. 1.
Figure 7:
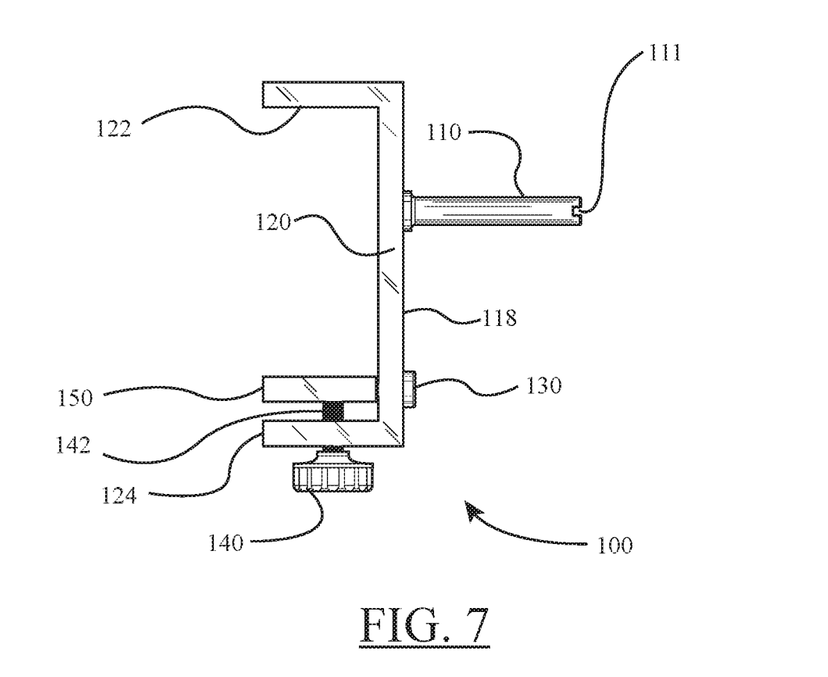
FIG. 7 is a top plan view of the level marking device of FIG. 1.

Turning now to FIGS. 1, 4, and 10, in the illustrative embodiment, the body portion 118 of the level marking device 100 further comprises a plurality of pin placement holes 160, 162, 164, 166 disposed therethrough. Each of the pin placement holes 160, 162, 164, 166 is configured to removably accommodate the pin member 110 so that a user is able to selectively position the pin member 110 on the body portion 118 of the level marking device 100. In the illustrative embodiment, each of the pin placement holes 160, 162, 164, 166 corresponds to a respective one of a plurality of predetermined stud widths. More specifically, in the illustrative embodiment, the pin placement hole 160 corresponds to a pin placement position for accommodating a two (2) inch wide stud, the pin placement hole 162 corresponds to a pin placement position for accommodating a one and one-half (1½) inch wide stud, the pin placement hole 164 corresponds to a pin placement position for accommodating a one and one-quarter (1¼) inch wide stud, and the pin placement hole 166 corresponds to a pin placement position for accommodating a two and one-half (2½) inch wide stud. As shown in the exploded view of FIG. 10, in the illustrative embodiment, a first end portion of the pin member 110 comprises external threads 113 and each of the pin placement holes 160, 162, 164, 166 comprises internal threads that correspond to the external threads 113 on the pin member 110 such that the first end portion of the pin member 110 is capable of threadingly engaging a selected one of the pin placement holes 160, 162, 164, 166. Also, as shown in the illustrative embodiment, a second end portion of the pin member 110 comprises a slot 111 formed therein for accommodating a screwdriver for tightening the pin member 110 on the body portion 118 of the level marking device 100 (refer to FIGS. 1, 6, 7, and 10). In addition, as shown in FIGS. 3 and 9, the pin member 110 may further be provided with a flared base portion 112 for stabilizing the pin member 110 on the transverse wall 120 of the body portion 118 of the level marking device 100.

Figures 13, 14:
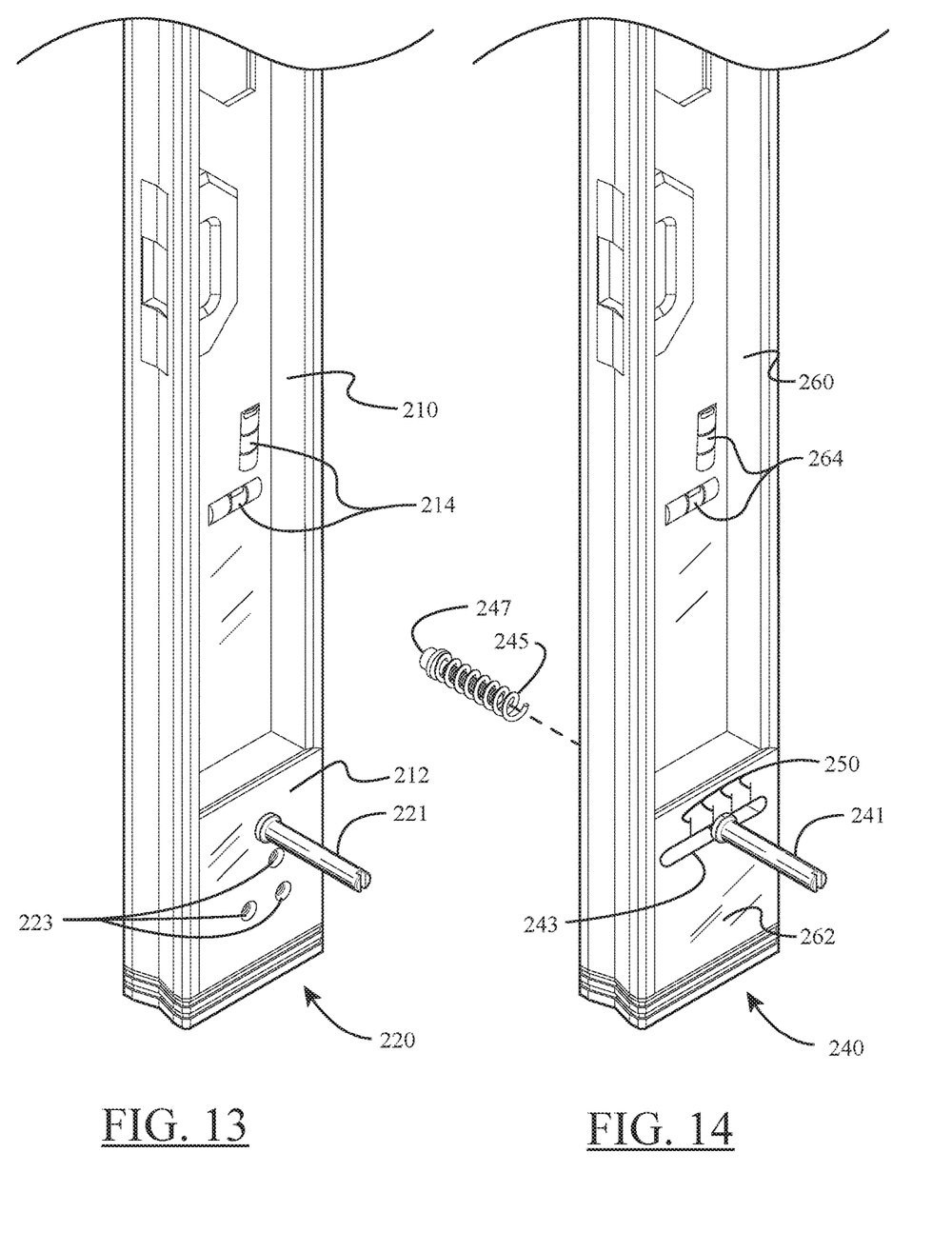
FIG. 13 is a perspective view depicting an alternative embodiment of the level marking device, wherein the pin member of the level marking device is integrated into a level, and the pin member is selectably positionable in a plurality of different pin placement holes.
FIG. 14 is a perspective view depicting another alternative embodiment of the level marking device, wherein pin member of the level marking device is integrated into a level, and the pin member slidable within an elongate slot.

A first alternative embodiment of the level marking device for drywall installation is seen generally at 220 in FIG. 13. The level marking device 220 of FIG. 13 is similar in many respects to the level marking device 100 described above. However, unlike the level marking device 100 described above, the features of the level marking device 100 are built into a level 210 (refer to FIG. 13), rather than the level marking device being provided as an accessory to an existing level 200 (see FIG. 1).

As shown in the alternative embodiment of FIG. 13, the level marking device 220 comprises a carpenter's level 210, the carpenter's level 210 including a body portion 212 and level indicator(s) 214 for establishing a horizontal and/or vertical line or plane; and a pin member 221 coupled to the carpenter's level 210, the pin member 221 protruding outwardly from a surface of the carpenter's level 210, the pin member 221 configured to be positioned at the intersection of one side of a stud 310 and an edge of drywall 300 (as described above with regard to FIG. 11). As described above for the level marking device 100, the level marking device 220 is configured to position one edge of the carpenter's level 210 approximately aligned with a centerline of the stud 310 so as to enable a guide line to be marked on the drywall 300 that approximates the centerline of the stud 310.

As shown in FIG. 13, the body portion 212 of the carpenter's level 210 further comprises a plurality of pin placement holes 223 disposed therethrough. Similar to that described above for the pin placement holes 160, 162, 164, 166, each of the pin placement holes 223 is configured to removably accommodate the pin member 221 so that a user is able to selectively position the pin member 221 on the body portion 212 of the carpenter's level 210. Each of the pin placement holes 223 corresponds to a respective one of a plurality of predetermined stud widths (e.g., the one and one-quarter inch, one and one-half inch, two inch, and two and one-half inch stud widths described above). The structure of the pin member 221 depicted in the alternative embodiment of FIG. 13 is generally the same as the pin member 110 described above.

A second alternative embodiment of the level marking device for drywall installation is seen generally at 240 in FIG. 14. The level marking device 240 of FIG. 14 is similar in many respects to the level marking device 220 described above. However, unlike the level marking device 220 described above, the pin member 241 is adjustably received within an elongate slot 243 (refer to FIG. 14), rather than being selectably positionable in a plurality of different pin placement holes 223 (see FIG. 13).

As shown in the alternative embodiment of FIG. 14, the level marking device 240 comprises a carpenter's level 260, the carpenter's level 260 including a body portion 262 and level indicator(s) 264 for establishing a horizontal and/or vertical line or plane; and a pin member 241 coupled to the carpenter's level 260, the pin member 241 protruding outwardly from a surface of the carpenter's level 260, the pin member 241 configured to be positioned at the intersection of one side of a stud 310 and an edge of drywall 300 (as described above with regard to FIG. 11). As described above for the level marking device 220, the level marking device 240 is configured to position one edge of the carpenter's level 260 approximately aligned with a centerline of the stud 310 so as to enable a guide line to be marked on the drywall 300 that approximates the centerline of the stud 310.

As shown in FIG. 14, the body portion 262 of the carpenter's level 260 further comprises an elongate slot 243 disposed therethrough. The pin member 241 is configured to be slidably displaced along a length of the elongate slot 243 so that a user is able to selectively position the pin member 241 on the body portion 262 of the carpenter's level 260 to accommodate a particular stud width (e.g., the one and one-quarter inch, one and one-half inch, two inch, and two and one-half inch stud widths described above). The structure of the pin member 241 depicted in the alternative embodiment of FIG. 14 is generally the same as the pin members 110, 221 described above, except for the manner in which the pin member 241 attaches to the body portion 262 of the carpenter's level 260. As shown in FIG. 14, the pin member 241 is provided with a rear fastener member 247 (e.g., screw or bolt 247) that secures the pin member 241 to the body portion 262 of the carpenter's level 260. More specifically, the external threads of the fastener member 247 threadingly engage with internal threads in the pin member 241 to secure the pin member 241 to the body portion 262 of the carpenter's level 260. In the illustrative embodiment, it can be seen that a spring member 245 is further provided around the fastener member 247 (see FIG. 14). When a user wants to adjust the position of the pin member 241, he or she applies an axial pulling force to the pin member 241, which compresses the spring member 245, and allows the pin member 241 to be displaced along a length of the elongate slot 243 to a selected position that corresponds to a particular stud width. Unlike the preceding embodiments described above that have discrete adjustability by virtue of the pin placement holes 160, 162, 164, 166, 223, the adjustable displacement of the pin member 241 within the elongate slot 243 allows continuous, universal adjustment for any stud width within the range afforded by the slot 243. Also, as shown in the illustrative embodiment of FIG. 14, it can be seen that the body portion 262 of the carpenter's level 260 may further comprise indicia 250 disposed adjacent to the elongate slot 243 (e.g., in the form of vertical indicia lines). The indicia 250 denote a plurality of different stud widths so as to facilitate the correct positioning of the pin member 241 along the length of the elongate slot 243 by the user for a desired stud width (e.g., the one and one-quarter inch, one and one-half inch, two inch, and two and one-half inch stud widths described above).

In one or more alternative embodiments, the pin members 110, 221, 241 may be provided with locking hinges so as to allow the pin members 110, 221, 241 to be folded inwardly toward the level body portion when the level marking device 100, 220, 240 is not being used.

In the illustrative embodiments described above, the components of the level marking devices 100, 220, 240 may be formed from a suitable rigid material (e.g., a suitable metal or hard plastic). For example, at least some of the components of the level marking devices 100, 220, 240 may be formed from aluminum or steel (e.g., the body portion 118 and the pin member 110).

Figure 12:
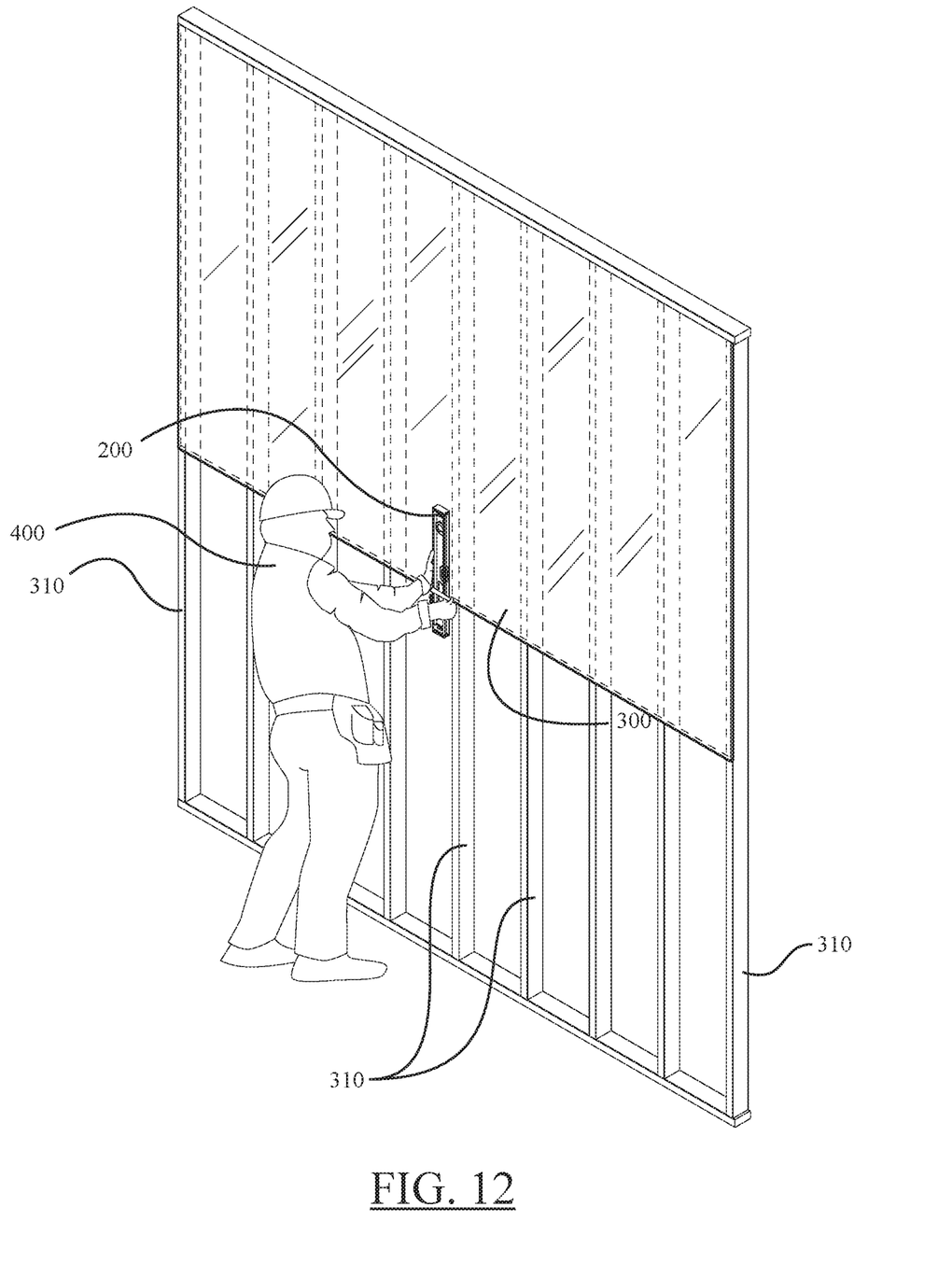
FIG. 12 is another perspective view illustrating the manner in which the level marking device of FIG. 1 is used to mark a stud centerline on drywall.

Now, with reference to FIGS. 11 and 12, an exemplary manner in which level marking device 100, 220, 240 is used to accurately mark a guide line on the drywall will be described. First, as shown in FIG. 11, the pin member 110 of the level marking device 100 is positioned at the intersection of one side of a stud 310 and a bottom edge of a drywall sheet 300 by the installer 400. Then, the installer 400 positions the level 200 in an approximately 90 degree orientation using the level indicator of the level 200, and strikes a pencil line along the stud side of the level 200 to approximately locate the centerline of the stud 310 (see FIG. 12). Finally, the installer 400 inserts screws or nails along this centerline in order to secure the drywall sheet 300 to the stud 310. Because the centerline of the stud 310 was accurately located using the level marking device 100, the screws or nails inserted by the installer 400 are driven into the stud 310 as intended, rather than missing the stud 310 on one side or the other. While the functionality of the level marking device was described for the first embodiment thereof, it is to be understood this description is equally applicable to the level marking devices 220 and 240 depicted in FIGS. 13 and 14, respectively. Also, while the level marking devices 100, 220, and 240 are described in conjunction with marking drywall in the illustrative embodiment, it is to be understood that the level marking devices 100, 220, and 240 described herein may be used to mark any type of panel or sheet being installed on a wall or ceiling (e.g., wood paneling, etc.).

It is readily apparent that the aforedescribed level marking device 100, 220, 240 for drywall installation offers numerous advantages. First, the level marking device 100, 220, 240 makes it significantly easier to mark the center of the studs. Secondly, the level marking device 100, 220, 240 enables the quicker marking of the center of the studs. Finally, the level marking device 100, 220, 240 results in the more accurate marking of the center of studs.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A level marking device for drywall installation, the level marking device comprising:
   a body portion configured to be attached to a carpenter's level;
   a pin member coupled to the body portion, the pin member configured to be positioned at the intersection of one side of a stud and an edge of drywall; and
   a width adjustment member slidably coupled to the body portion of the level marking device, the width adjustment member configured to enable the level marking device to be attached to carpenter's levels having different widths;

wherein the level marking device is configured to position one edge of the carpenter's level approximately aligned with a centerline of the stud so as to enable a guide line to be marked on the drywall that approximates the centerline of the stud.

2. The level marking device according to claim 1, wherein the body portion of the level marking device is approximately C-shaped such that the body portion of the level marking device is configured to overlap two oppositely disposed sides of the carpenter's level.

3. The level marking device according to claim 1, further comprising one or more tightening knobs disposed on the body portion of the level marking device, the one or more tightening knobs configured to tighten the width adjustment member against one side of the carpenter's level so that the body portion of the level marking device is capable of being securely attached to the carpenter's level.

4. The level marking device according to claim 1, wherein the body portion of the level marking device further comprises a plurality of pin placement holes disposed therethrough, each of the pin placement holes configured to removably accommodate the pin member so that a user is able to selectively position the pin member on the body portion of the level marking device, and each of the pin placement holes corresponding to a respective one of a plurality of predetermined stud widths.

5. The level marking device according to claim 4, wherein a first end portion of the pin member comprises external threads and at least one of the pin placement holes comprises internal threads that correspond to the external threads on the pin member such that the first end portion of the pin member is capable of threadingly engaging the at least one of the pin placement holes.

6. The level marking device according to claim 5, wherein a second end portion of the pin member comprises a slot formed therein for accommodating a screwdriver for tightening the pin member on the body portion of the level marking device.

7. The level marking device according to claim 4, wherein the plurality of predetermined stud widths are selected from the group consisting of: (i) a one and one-quarter inch wide stud, (ii) a one and one-half inch wide stud, (iii) a two inch wide stud, (iv) a two and one-half inch wide stud, and (v) combinations thereof.

8. A level marking device for drywall installation, the level marking device comprising:
a carpenter's level, the carpenter's level including a body portion and a level indicator for establishing a horizontal and/or vertical line or plane; and
a pin member coupled to the carpenter's level, the pin member protruding outwardly from a surface of the carpenter's level, the pin member configured to be positioned at the intersection of one side of a stud and an edge of drywall;
wherein the level marking device is configured to position one edge of the carpenter's level approximately aligned with a centerline of the stud so as to enable a guide line to be marked on the drywall that approximates the centerline of the stud; and
wherein the body portion of the carpenter's level further comprises a plurality of pin placement holes disposed therethrough, each of the pin placement holes configured to removably accommodate the pin member so that a user is able to selectively position the pin member on the body portion of the carpenter's level, and each of the pin placement holes corresponding to a respective one of a plurality of predetermined stud widths.

9. The level marking device according to claim 8, wherein a first end portion of the pin member comprises external threads and at least one of the pin placement holes comprises internal threads that correspond to the external threads on the pin member such that the first end portion of the pin member is capable of threadingly engaging the at least one of the pin placement holes.

10. The level marking device according to claim 9, wherein a second end portion of the pin member comprises a slot formed therein for accommodating a screwdriver for tightening the pin member on the body portion of the level marking device.

11. The level marking device according to claim 8, wherein the plurality of predetermined stud widths are selected from the group consisting of: (i) a one and one-quarter inch wide stud, (ii) a one and one-half inch wide stud, (iii) a two inch wide stud, (iv) a two and one-half inch wide stud, and (v) combinations thereof.

12. A level marking device for drywall installation, the level marking device comprising:
a carpenter's level having a length, a width, and a depth, the carpenter's level including a body portion and a level indicator for establishing a horizontal and/or vertical line or plane, the length of the carpenter's level being greater than the width of the carpenter's level, and the width of the carpenter's level being greater than the depth of the carpenter's level; and
a pin member coupled to the carpenter's level, the pin member protruding outwardly from a surface of the carpenter's level, the pin member configured to be positioned at the intersection of one side of a stud and an edge of drywall;
wherein the level marking device is configured to position one edge of the carpenter's level approximately aligned with a centerline of the stud so as to enable a guide line to be marked on the drywall that approximates the centerline of the stud; and
wherein the body portion of the carpenter's level further comprises an elongate slot disposed therethrough, the elongate slot extending along the width of the carpenter's level, the pin member configured to be slidably displaced along a length of the elongate slot across the width of the carpenter's level so that a user is able to selectively position the pin member on the body portion of the carpenter's level to accommodate a particular stud width.

13. The level marking device according to claim 12, wherein the body portion of the carpenter's level further comprises indicia disposed adjacent to the elongate slot, the indicia denoting a plurality of different stud widths so as to facilitate the correct positioning of the pin member along the length of the elongate slot by the user for a desired stud width.

14. The level marking device according to claim 13, wherein the plurality of different stud widths denoted by the indicia are selected from the group consisting of: (i) a one and one-quarter inch wide stud, (ii) a one and one-half inch wide stud, (iii) a two inch wide stud, (iv) a two and one-half inch wide stud, and (v) combinations thereof.

* * * * *